United States Patent [19]
Du et al.

[11] Patent Number: 5,644,646
[45] Date of Patent: Jul. 1, 1997

[54] VESSEL ENHANCEMENT FILTERING IN MAGNETIC RESONANCE ANGIOGRAPHY

[75] Inventors: Yiping Du, Salt Lake City; Dennis L. Parker, Centerville, both of Utah

[73] Assignee: University of Utah Research Foundation, Salt Lake City, Utah

[21] Appl. No.: 286,523

[22] Filed: Aug. 5, 1994

[51] Int. Cl.$^6$ ................................................. G06K 9/00
[52] U.S. Cl. .................... 382/128; 382/108; 382/130; 324/308; 324/309; 324/312; 128/696; 128/653.3; 128/713
[58] Field of Search ................................ 382/108, 128, 382/130, 132; 324/309, 312, 308; 128/696, 653.3, 713

[56] References Cited

U.S. PATENT DOCUMENTS

| | | | |
|---|---|---|---|
| 4,783,839 | 11/1988 | Bamber | 382/128 |
| 4,789,933 | 12/1988 | Chen et al. | 382/128 |
| 4,851,984 | 7/1989 | Doi et al. | 382/108 |
| 5,175,773 | 12/1992 | Garreau et al. | 382/130 |
| 5,297,550 | 3/1994 | Margosian | 382/128 |
| 5,319,549 | 6/1994 | Katsuragawa et al. | 382/108 |
| 5,351,305 | 9/1994 | Wood et al. | 382/128 |

OTHER PUBLICATIONS

Du et al., "Vessel Enhancement Filtering of 3D MR Angiography," Proceedings of the 12th Annual Meeting of the Society of Magnetic Resonance in Medicine, Aug. 14–20, 1993, p. 454.

Du et al., "Band–Limited Interpolation in MR Angiography," Proceedings of the 12th Annual Meeting of the Society of Magnetic Resonance in Medicine, Aug. 14–20, 1993, p. 704.

Edelman et al., "Improved Time–of–Flight MR Angiography of the Brain with Magnetization Transfer Contrast," Radiology, Aug. 1992, pp. 395–399.

Hylton et al., "Impact of Section Doubling on MR Angiography," Radiology, vol. 185, No. 3, pp. 899–902 Dec. 1992.

Kramer et al., "Applications of Voxel Shifting in Magnetic Resonance Imaging," Investigative Radiology, Dec. 1990, vol. 25, No. 12, pp. 1305–1310.

Lin et al., "Automated Local Maximum–Intensity Projection with Three–dimensional Vessel Tracking," JMRI Sep./Oct. 1992, pp. 519–526.

Saloner et al., "Image and Object Registry and Connected Voxel Algorithms for Display of MRA Vessel Signal," Book of Abstracts: Society of Magnetic Resonance in Medicine 1992, Berkeley California, p. 475.

Primary Examiner—Jose L. Couso
Assistant Examiner—Anh Hong Do
Attorney, Agent, or Firm—Trask, Britt & Rossa

[57] ABSTRACT

An MRI system includes an MR cylinder, a radio frequency (RF) coil (or antenna), preliminary processing circuitry, and a computer processing system. The RF receiver produces an electrical signal to the preliminary processing circuitry representative of the sensed magnetic field. The preliminary processing circuitry provides a measurement data signal S (which is in the frequency domain) to the computer processing system, which includes a computer processor and a memory. The computer processor stores measurement data signal S as a data matrix $M_2$ in a larger data matrix $M_3$ that contains zero values in memory locations surrounding data matrix $M_2$. This is referred to as zero-padding. The computer processor performs (zero-padded) Fourier transformation on data matrix $M_3$ to produce an interpolated image data matrix $I_D$. Interpolated image data matrix $I_D$ is processed through enhancement filtering to provide an enhanced image data matrix $I_E$ that has improved visibility of vessels. The filtering may be performed by a variety of filters including a max-min SD filter or a cross-section filter.

24 Claims, 9 Drawing Sheets

VESSEL ENHANCEMENT FILTERING IN MAGNETIC RESONANCE ANGIOGRAPHY

BACKGROUND OF THE INVENTION

This invention was supported in part by NIH grant RO1 HL48223 through the NHLBI agency. The United States Government may have some rights in the invention.

FIELD OF THE INVENTION

The invention generally concerns vessel enhancement filtering to improve visibility of vessels and, more particularly, to a method and system for vessel enhancement filtering in magnetic resonance angiography.

STATE OF THE ART

In three-dimensional ("3D") flow compensated gradient echo magnetic resonance angiography ("MRA") techniques, vessels usually have a higher signal intensity than highly saturated stationary tissues. However, small vessels usually have low vessel contrast due to the signal saturation that results from the slow flow and the partial volume effect that results from the small vessel size. During the maximum intensity projection ("MIP") of 3D MRA image data, if the signal intensity of a small vessel is lower than the maximum background intensity along the path of a projection ray, this small vessel may be invisible in that projection. MRA is performed through a magnetic resonance imaging ("MRI") system.

Figure 1A:
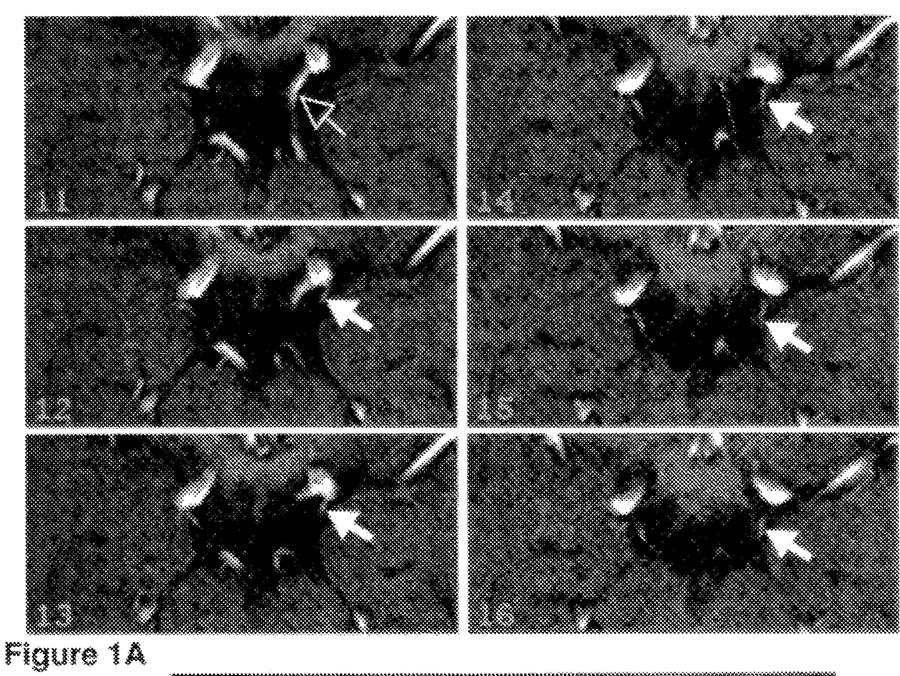
FIG. 1A shows copies of six photographs numbered 11–16 that show 3D source images of an intracranial 3D time-of-flight (TOF) MRA at a region around the posterior communicating arteries.
Figure 1B:
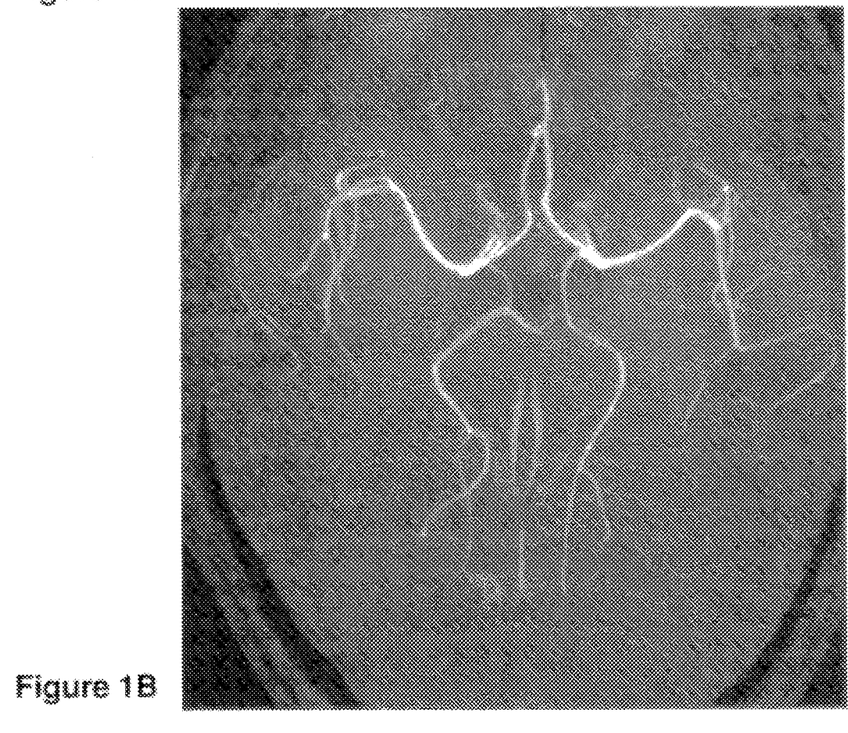
FIG. 1B is a copy of a photograph of an axial maximum intensity projection ("MIP") image of the 3D MRA image data.

FIGS. 1A and 1B may demonstrate that small vessels tend to disappear in the MIP images. FIG. 1A shows the 3D source images of an intracranial 3D time-of-flight ("TOF") MRA at a region around the posterior communicating arteries. In FIG. 1A, a right anterior choroidal artery near the right posterior communicating artery is visible in the 3D source images. However, this small vessel is entirely invisible in the axial MIP image of the 3D MRA image data (see FIG. 1B).

Recently developed magnetization transfer contrast ("MTC") techniques have been shown to substantially enhance the vessel visibility in 3D TOF MRA. In MTC MRA, off resonance RF excitation is used to preferentially pre-saturate stationary tissues dominated by "restricted water". This MTC process results in a significant increase in vessel contrast and thus vessel visibility. However, the use of MTC MRA results in a considerable amount of RF power deposition in the subject imaged. Because of the increased RF power deposition, MTC MRA requires an increase in repetition time ("TR").

In digital image processing, line detection filters have been developed to extract line structures from digital images. Laplacian filtering and Sobel filtering are among the most successful line detection techniques in many applications. However, these filters lack immunity to noise spikes and usually do not have satisfactory performance in 3D MRA images.

SUMMARY OF THE INVENTION

The present invention includes a system for enhancing lines in images produced from data that represent a structure of anatomy of a subject. The data may be produced in a magnetic resonance imaging device. The system may include a detector that detects a signal composed of energy passing through and modified by the structure of anatomy and that produces a detection signal reflective of the detected modified energy signal. The system may include preprocessing circuitry that receives the detection signal and provides a preprocessed signal in response thereto. The system may include a computer processor system that receives the preprocessed signal and performs a zero-padded Fourier transformation thereon to provide an interpolated image data matrix $I_D$ and that performs a line enhancing filtering process on the interpolated image data matrix $I_D$ to provide an enhanced image data matrix $I_E$ in which lines are enhanced.

The line enhancing filtering process may be a second difference (SD) filtering process. The second difference (SD) filtering process may be a non-linear filtering process. The second difference (SD) filtering process may be a max-min SD filtering process or a cross-section filtering process. The filtering process may include a second difference (SD) operation of the form $SD_{ij}=2f(i)-f(i-1)-f(i+1)$, where f(i) is the image intensity at point i, and f(i-1) and f(i+1) are the image intensity at the neighboring points of f(i) along direction j.

The line enhancing filtering process may be performed in a hardware filter.

The zero-padded Fourier transformation provides an interpolation.

In one embodiment, an MRI system includes an MR cylinder, a radio frequency (RF) coil (or antenna), preliminary processing circuitry, and a computer processing system. The RF receiver produces an electrical signal to the preliminary processing circuitry representative of the sensed magnetic field. The preliminary processing circuitry provides a measurement data signal S (which is in the frequency domain) to the computer processing system, which includes a computer processor and a memory. The computer processor stores measurement data signal S as a data matrix $M_2$ in a larger data matrix $M_3$ that contains zero values in memory locations surrounding data matrix $M_2$. This is referred to as zero-padding. The computer processor performs (zero-padded) Fourier transformation on data matrix $M_3$ to produce an interpolated image data matrix $I_D$. Interpolated image data matrix $I_D$ is processed through enhancement filtering to provide an enhanced image data matrix $I_E$ that has improved visibility of vessels. The filtering may be performed by a variety of filters including a max-min SD filter or a cross-section filter.

DETAILED DESCRIPTION OF PREFERRED EMBODIMENTS

A. Hardware Overview

Figure 2:
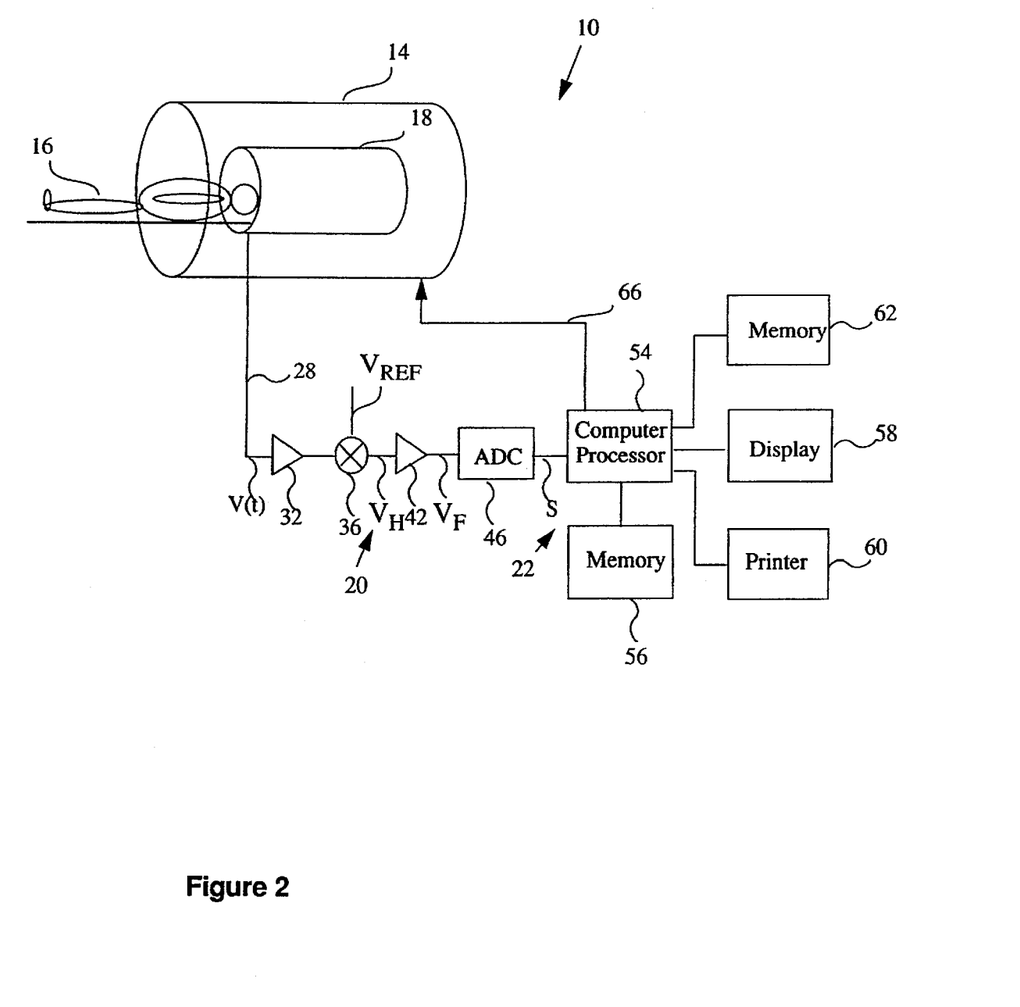
FIG. 2 is a schematic view of an MRI system that includes a computer processing system according to the present invention.

Referring to FIG. 2, an MRI system 10 includes an MR cylinder 14 in which a subject 16 is positioned, a radio frequency (RF) coil (or antenna) 18, preprocessing circuitry such as preliminary processing circuitry 20, and a computer processing system such as computer processing system 22. Large magnetic fields are created inside cylinder 14. The magnetic fields are changed during the imaging process.

RF receiver 18 produces an electrical signal v(t) on conductor(s) 28 representative of the sensed magnetic field. In a preferred embodiment, the electrical signal v(t) on conductor(s) 28 is in a spatial frequency domain and is a radio frequency voltage signal having a frequency of 63 MHz±100 KHz and is in the spatial frequency domain.

The preprocessing circuitry provides a preprocessed signal such as measurement data signal S, described below. Preliminary processing circuitry 20 may be any of various well known systems including the following. An RF preamplifier 32 provides an amplified v(t) to multiplier 36, which may be a heterodyne detector that receives a reference signal $v_{REF}$. Multiplier 36 provides a signal $v_H$ which is provided to a bandpass amplifier 42. Amplifier 42, which may pass frequencies from 0–200 Khz, provides a signal $v_F$ to an analog-to-digital converter (ADC) 46. ADC 46 provides a measurement data signal S to computer processing system 22.

The functions of preprocessing circuitry 20 could be performed through various other well-known circuits.

Computer processing system 22 includes a computer processor 54, which preferably includes a microprocessor, and memory 56. Measurement data signal S may be stored in memory 56. As explained below, computer processor 54 operates on measurement data signal S to produce image data, which preferably is in the form of an interpolated image data matrix $I_D$. Interpolated image data matrix $I_D$ is processed through enhancement filtering to provide enhanced image data, which preferably is in the form of an enhanced image data matrix $I_E$. Enhanced image data matrix $I_E$ has improved visibility of vessels compared with that of image data matrix $I_D$. Computer processor 54 provides enhanced image data matrix $I_E$ to memory 56, a display 58, a printer 60, and/or a memory 62. Memory 62 may be a portable and/or long term storage.

The magnetic fields in MR cylinder 14 may be controlled by computer processor 54 through conductor(s) 66.

Figure 3:
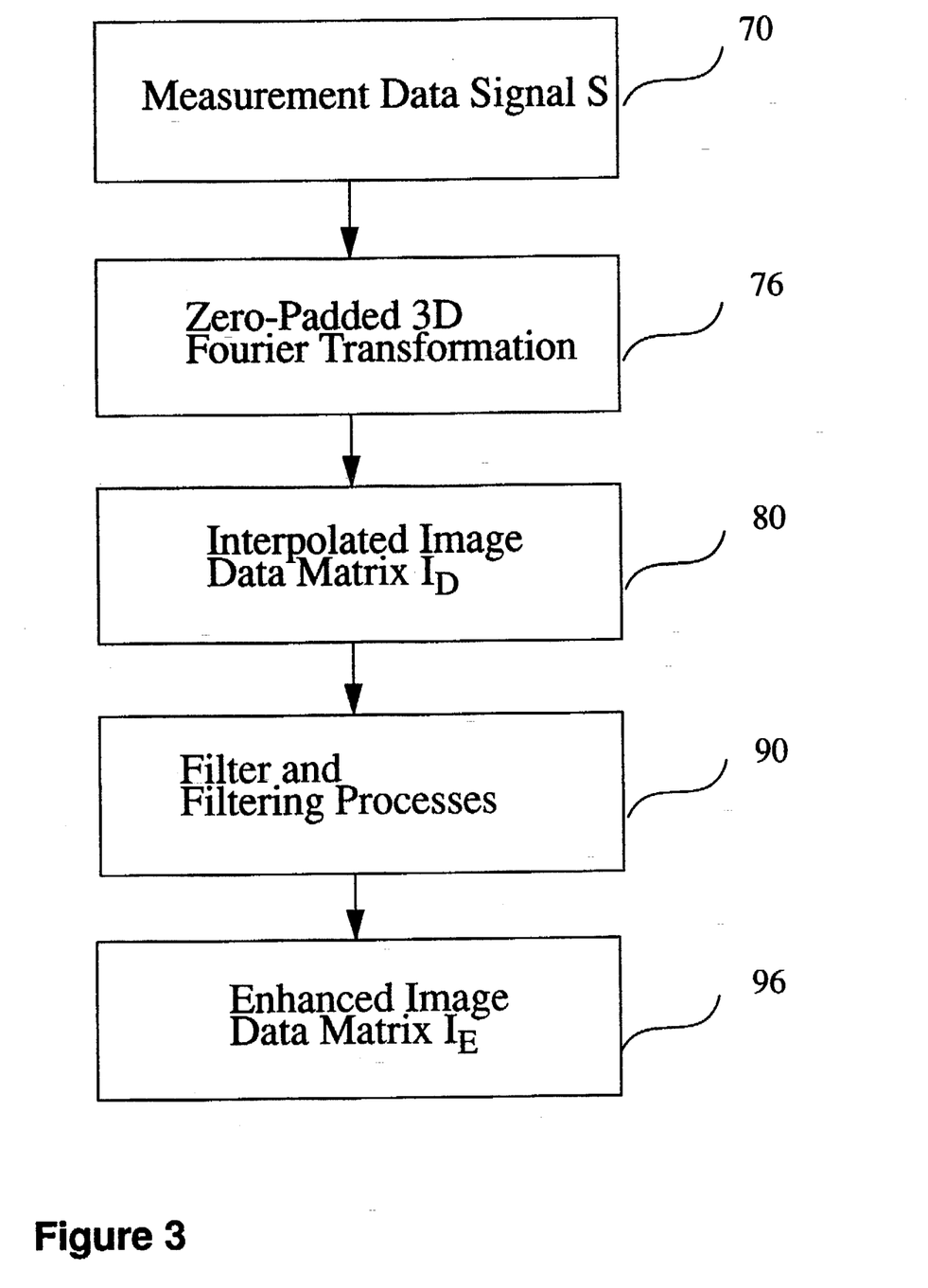
FIG. 3 shows a flow chart of data states and processes in the computer processing system of FIG. 2.

FIG. 3 is a flow chart of data states in memory 56 and processes performed in computer processor 54. Box 70 represents measurement data signal S in memory 56. In a preferred embodiment, measurement data signal S is in a spatial frequency domain. As represented by box 76, computer processor 54 performs zero-padded 3D Fourier Transforms (forward or reverse) on measurement data signal S to produce interpolated image data matrix $I_D$. Box 80 represents interpolated image data matrix $I_D$ which is stored in memory 56. As examples, interpolated image data matrix $I_D$ may be in the form of a 256×256×64 voxel matrix, a 512×512×128 voxel matrix, or a 1024×1024×256 voxel matrix. Other size matrices may also be used. The 3D Fourier Transforms are performed with zero-padded interpolation, described below. In a preferred embodiment, the Fourier Transforms reconstruct frequency spatial data of signal S into spatial intensity distributions of interpolated image data matrix $I_D$.

The interpolated image data matrix $I_D$ is filtered through the filter and filtering processes represented by box 90. As represented in box 96, the filtered data constitutes an enhanced image data matrix $I_E$, which may be displayed. In a preferred embodiment, interpolated image data matrix $I_D$ and enhanced image data matrix $I_E$ have the same dimensions.

In a preferred embodiment, the filter is performed in software in a digital computer. Nevertheless, the filter and filtering processes could be implemented in hardware. It is expected that such a hardware filter may be significantly faster and possibly less expensive (particularly in the case of large sales volumes) than using a computer and software. A hardware version of (max-min SD and cross-section filters) is described below in connection with FIG. 7.

B. Modeling of Three-Dimensional MRA Image

In a 3D MRA image data set, a small vessel should appear as a sequence of voxels with higher signal intensity than the surrounding background. The signal from the stationary tissue background is highly saturated with very little spatial variation. Image noise is randomly distributed intensity variations over the entire image data. Therefore, the stationary tissue is modeled as a constant background, and a small vessel is modeled as a single line of voxels with higher intensity than the background. It is assumed that noise spikes in the images are independent from voxel to voxel.

C. Zero-padded Interpolation

It is believed that the filters described below work best when the vessel brightness is uniform for the voxels along the vessel path. When the diameter of a small vessel is on the order of the image voxel size, the vessel brightness is found to be a strong function of position relative to the voxel grid. Voxels where the vessel is centered will yield a maximum signal for the vessel, and voxels where the vessel passes between centers will have a reduced signal shared between two or more voxels. The resultant contrast-to-noise ratio (CNR) of a vessel at such a point is significantly reduced since none of these voxels are totally occupied by vessel. This vessel contrast loss is often called the partial volume artifact. Small vessels in MRA usually have degraded vessel contrast and continuity due to the partial volume artifact. Zero-padded interpolation, described in greater detail below, significantly reduces the partial volume artifacts and thereby improves the vessel contrast and continuity.

In a preferred embodiment, zero-padded interpolation is performed as follows. A memory matrix $M_1$ comprising X rows and Y columns with a depth of Z is set aside in memory 56. For convenience, the rows of matrix $M_1$ are referred to as $R_1, R_2, \ldots R_X$. Likewise, the columns of matrix $M_1$ are referred to as $C_1, C_2, \ldots C_Y$. Likewise, the depth units of matrix $M_1$ are referred to as $D_1, D_2, \ldots D_Z$. The depth units represent different layers of the subject. The contents of the memory location identified by the intersection of a particular row/column/depth represent a particular parameter (e.g. density) that is being measured. The contents of the memory location may be represented by many bits. Accordingly, the total memory required may be enormous.

Measurement data signal S is arranged in a data matrix $M_2$ comprising $N_1$ rows and $N_2$ columns with a depth of $N_3$, where $N_1$, $N_2$, and $N_3$ are preferably less than X, Y, and Z, respectively. (Note that $N_1$ could equal $N_2$.) It is possible to zero pad less than all three rows, columns, and depth.

The data of matrix $M_2$ is arranged within the middle portion of matrix $M_1$. Consider the following example in which X=1024, Y=1024, Z=128, $N_1$=512, $N_2$=512, $N_3$=64. In that case, the rows of matrix $M_2$ could be stored in rows $R_{257}$–$R_{768}$ of matrix $M_1$; the columns of matrix $M_2$ could be stored in columns $C_{257}$–$C_{768}$ of matrix $M_1$; and the depth units of matrix $M_2$ could be stored in depth units $D_{33}$–$D_{96}$ of matrix $M_1$.

A data matrix $M_3$ represents the data stored in memory matrix $M_1$. The contents of memory locations of matrices $M_1$ and $M_3$ at the union of $R_1$–$R_{256}$ and $R_{768}$–$R_{1024}$, $C_{1-C256}$ and $C_{768}$–$C_{1024}$, and $D_1$–$D_{32}$ and $D_{97}$–$D_{128}$ are (and in a preferred embodiment remains) zero. In other words, all locations in data matrix $M_3$ other than those also in data matrix $M_2$ are zero. As used herein, zero-padding is the process of assembling a data matrix (such as $M_3$) with zeros at the edges of a data matrix (such as $M_2$) described above.

The effect of adding the zeros around data matrix $M_2$ is an interpolation because the Fourier transform performed on data matrix $M_3$ produces image data points between points that would be obtained if the Fourier transform were performed merely on data matrix $M_2$. (Note that data matrix $M_2$ is in the spatial frequency domain.)

Zero-padded interpolation might also be referred to as zero-filled interpolation or band-limited interpolation.

As used herein, the term "zero-padded Fourier transformation" refers to performing a Fourier transform on a data matrix that has been zero-padded. As used herein, the term "zero-padded interpolation" refers to the interpolation that results from the zero-padded Fourier transformation.

D. Filtering

1. Properties of Second Difference (SD) Filtering

The filter and filtering processes represented by box 90 are described in detail as follows.

The filter of box 90 is a nonlinear technique designed to enhance line structures and suppress both noise spikes and uniform regions. Twenty-six neighbor Laplacian line detection filtering is a convolution of the original 3D image data with a 3×3×3 kernel. A Laplacian convolution kernel is isotropic. However, a small vessel in a 3D MRA image data is anisotropic while a noise spike is more or less isotropic. Therefore, for a filter to enhance small vessels and suppress image noise, an anisotropic kernel is more appropriate.

Figure 4:
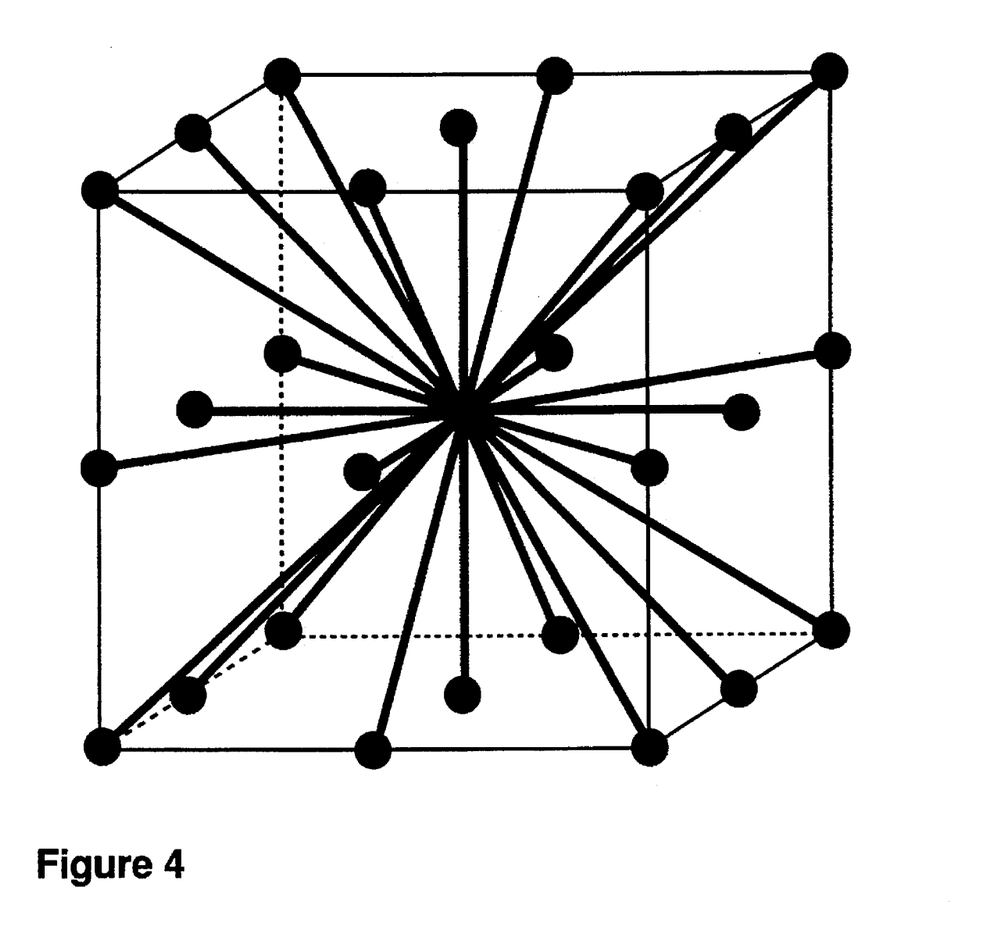
FIG. 4 is a representation of 27 grid points and discrete directions of a kernel in the present invention.

The anisotropic filtering may be implemented by convolving the whole 3D image data block with a 3×3×3 non-linear kernel. This kernel has 27 grid points and 13 discrete directions as shown in FIG. 4. These 13 discrete directions can be written in Cartesian coordinates as: (1, 0, 0), (0, 1, 0), (0, 0, 1), (1, 1, 0), (1, –1, 0), (1, 0, 1), (1, 0, –1), (0, 1, 1), (0, –1, 1), (1, 1, 1), (1, –1, 1), (1, 1, –1), and (1, –1, –1).

A model of 3D MRA for the design of vessel enhancement filters is as follows. A second difference (SD) operator is performed on each of the 13 discrete directions in the non-linear kernel. The SD operation at point i along a discrete direction j is defined in equation (1), below:

$$SD_{ij} = 2f(i) - f(i-1) - f(i+1) \qquad (1),$$

where f(i) is the image intensity at point i, and f(i–1) and f(i+1) are the image intensity at the neighboring points of f(i) along direction j.

Based on the modeling above, the SD operator has the following properties:

1. SD has a large positive value at a vessel point in a direction perpendicular to the vessel. SD has a small value, either positive or negative, at a vessel point in a direction parallel to the vessel.
2. SD has a small value, either positive or negative, in all directions on a stationary background point.
3. SD has large value, either positive or negative, at a vessel point in all directions on a noise spike.

Through using these properties of the linear SD operator, non-linear anisotropic filters can be defined that reduce image background, enhance vessel structures, and suppress noise spikes.

2. Maximum-Minimum Second Difference (Max-Min SD) Filtering

A max-min SD filter can be formulated as follows. After the SD operation, the following non-linear operation is applied as in equation (2), below:

$$G(i) = \max_{j=1,2,\ldots,13}(SD_{ij}) - \max\left(0, \min_{j=1,2,\ldots,13}(SD_{ij})\right), \qquad (2)$$

in which G(i) is the intensity of the filtered image at point i, where point i is a point in the enhanced image data matrix $I_E$.

Equation (2) is explained as follows. The first term, which is simply written as max(SD) in the following text, is the maximum of SD in all 13 discrete directions at point i. For a point on a small vessel, max(SD) gives a large positive value at a direction perpendicular to the vessel. The min(SD) gives a small value, either positive or negative, at a direction along the vessel. Therefore, G(i) has a large positive value at this point. For a point on background, G(i) has a small value since both max(SD) and min(SD) are small. For a "positive" noise spike, both max(SD) and min(SD) are large positive values. Therefore, G(i) tends to have a small value, and this noise spike is suppressed. For a "negative" noise spike, both max(SD) and min(SD) are large negative values. Therefore, the second term of equation (2) is nulled (i.e., set to zero) and G(i) tends to have a large negative value. This noise spike will not appear in MIP images. The main reason for not simply using min(SD) as the second term in equation (2) is as follows. For a background point right next to a vessel, max(SD) is a value close to zero and min(SD) has a large negative value. Therefore max (SD)–min(SD) has an undesired large value. By using equation (2), these off-vessel background points would not be enhanced. For a noise spike on a vessel, both the maximum and minimum SDs are added with the same noise value. Accordingly, the noise spike does not affect the difference between the maximum and the minimum at all.

As an alternative to equation (2), the operation may be applied as in equation (3), below:

$$G(i) = \max\left(0, \max_{j=1,2,\ldots,13}(SD_{ij}) - \max\left(0, \min_{j=1,2,\ldots,13}(SD_{ij})\right)\right), \qquad (3)$$

in which G(i) is the intensity of the filtered image at point i.

The explanation of equation (2) applies to equation (3) except that the negative noise spike is removed by the final maximum process of equation (3), which makes all elements of the image data greater than or equal to zero.

3. "Cross-Section" Filtering

For a small vessel lying in the 3D kernel at point i in direction j, $SD_{ij}$ has a value close to zero. However, the SDs along directions (say, n=1, 2, ..., N) perpendicular to $\bar{j}$ have large positive values. The SDs at point i along a direction perpendicular to $\bar{j}$ are referred to as $SD_{ij}^n$, where n=1, 2, ..., N. The average of these $SD_{ij}^n$ also has a large positive value. The difference between the average of these $SD_{ij}^n$ and $SD_{ij}$ is a large positive value. Therefore, the cross-section filter is expressed as in equation (4), below:

$$G(i) = max\left(0, max\left(\frac{1}{N}\sum_{n=1}^{N} SD_{ij}^n - max(0, SD_{ij})\right)\right). \quad j=1,2,\ldots,13 \quad (4)$$

Note that the first "max(0," term is optional and is analogous to the difference between equation (2) and equation (3).

In this cross-section filter, the directions $\bar{n}$ which are perpendicular to a direction $\bar{j}$ in Cartesian coordinates are listed as follows:

For j=1: $\bar{j}$(1, 0, 0), N=4, $\bar{n}$ are (0, 1, 0), (0, 0, 1), (0, 1, 1), and (0, -1, 1);

For j=2: $\bar{j}$(0, 1, 0), N=4, $\bar{n}$ are (1, 0, 0), (0, 0, 1), (1, 0, 1) and (1, 0, -1);

For j=3: $\bar{j}$(0, 0, 1), N=4, $\bar{n}$ are (1, 0, 0), (0, 1, 0), (1, 1, 0) and (1, -1, 0);

For j=4: $\bar{j}$(1, 1, 0), N=4, $\bar{n}$ are (0, 0, 1), (1, -1, 0), (1, -1, 1) and (1, -1, -1);

For j=5: $\bar{j}$(1, -1, 0), N=4, $\bar{n}$ are (0, 0, 1), (1, 1, 0), (1, 1, 1) and (1, 1, -1);

For J=6: $\bar{j}$(1, 0, 1), N=4, $\bar{n}$ are (0, 1, 0), (1, 0, -1), (1, 1, -1) and (1, -1, -1);

For j=7: $\bar{j}$(1, 0, -1), N=4, $\bar{n}$ are (0, 1, 0), (1, 0, 1), (1, 1, 1) and (1, -1, 1);

For j=8: $\bar{j}$(0, 1, 1), N=4, $\bar{n}$ are (1, 0, 0) (1, 1, -1), (1, -1, 1) and (0, -1, 1);

For J=9: $\bar{j}$(0, -1, 1), N=4, $\bar{n}$ are (1, 0, 0), (1, 1, 1), (0, 1, 1) and (1, -1, -1);

For j=10: $\bar{j}$(1, 1, 1), N=3, $\bar{n}$ are (0, -1, 1), (1, 0, -1) and (1, -1, 0);

For J=11: $\bar{j}$(1, -1, 1), N=3, $\bar{n}$ are (0, 1, 1), (1, 0, -1) and (1, 1, 0);

For j=12: $\bar{j}$(1, 1, -1), N=3, $\bar{n}$ are (0, 1, 1), (1, -1, 0) and (1, 0, 1);

For j=13: $\bar{j}$(1, -1, -1), N=3, $\bar{n}$ are (0, -1, 1), (1, 0, 1) and (1, 1, 0).

For a point on a small vessel at point i in direction $\bar{j}$, max (0,$SD_{ij}$) has a small value and the average of $SD_{ij}^n$, which is the first term within the parentheses, is a large positive value. Therefore G (i) has a large positive value at point i. For a noise spike, both terms within the parentheses have large positive values. The difference between them should be small, and G (i) should be small.

The cross-section filter can be implemented with the following steps: 1) Calculate SD of a voxel at a discrete direction j within the kernel. If the SD has a negative value, set the value to zero (i.e., max(0,$SD_{ij}$)); 2) Calculate the average of SDs at directions (n=1, 2, ..., N) perpendicular to $\bar{j}$; 3) Subtract max(0,$SD_{ij}$) from the average of SDs obtained at step 2; 4) Repeat steps 1-3 for all 13 discrete directions and find the maximum as the value for the filtered image at point i.

The max-min SD filter and the cross-section filter each produce a better result when used in connection with zero-padded interpolation. Indeed, there is a synergistic effect in combining max-min SD filter or the cross-section filter (of box 90 of FIG. 3) with zero-padded interpolation (box 76 of FIG. 3).

E. Examples

This vessel enhancement filtering process was applied on 3D TOF MRA human image data. MRA images were acquired on a conventional GE SIGNAMR scanner (GE-Medical Systems, Milwaukee, Wis.) which operates at 1.5 T. To reduce echo time, the readout was made asymmetric such that the echo center was placed at a point before the center of the readout window. In the particular example, the shift was 25% of the total readout time.

The circle of Willis of a human volunteer was imaged with the 3D TOF technique (256×256×32 acquisition matrix, TR(ms)/TE(ms)/flip angle=46/7.0/25° FOV 18 cm slice thickness=0.75 mm).

F. Results

In tests, zero-padded interpolation was applied to double the image matrix dimensions in all three directions for all image data before filtering.

Figure 5A:
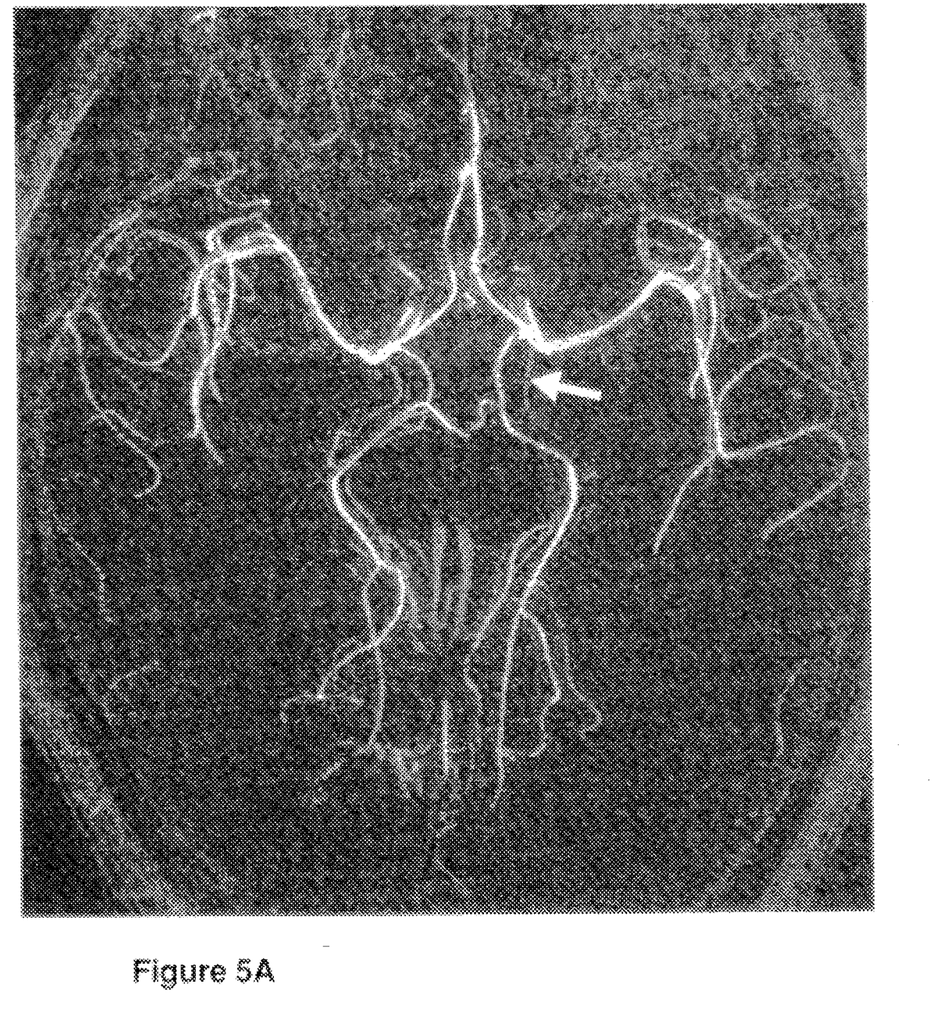
FIG. 5A is an MIP image of the image data of FIGS. 1A and 1B filtered with a Laplacian filter.

A twenty-six-neighbor Laplacian filter was applied on the 3D MRA image as shown in FIG. 1B. FIG. 5A is the MIP image of this filtered 3D image data. It is found that small vessel details were enhanced using this Laplacian filter. However, the MIP image of the 3D filtered image data appears noisy. The vessel continuity was degraded compared to the original image.

Figure 5B:
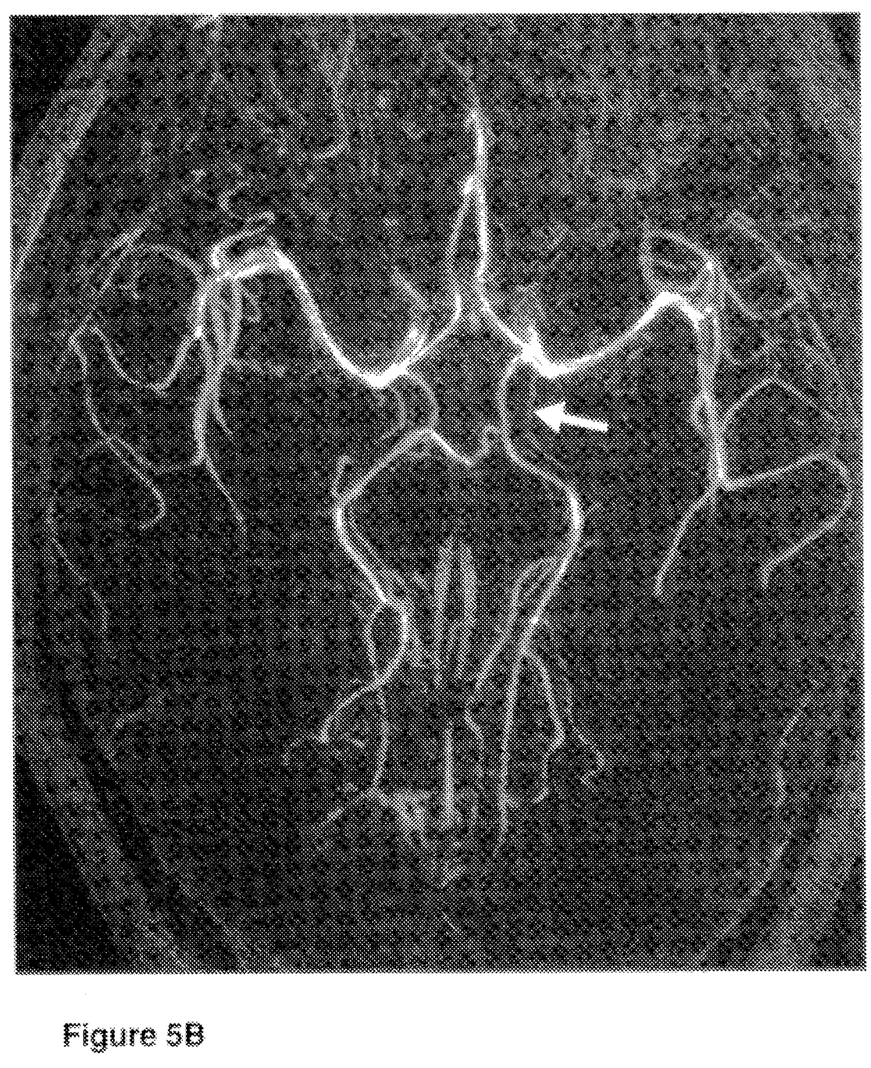
FIG. 5B is an MIP image of the image data of FIGS. 1A and 1B filtered with a max-min SD filter.

The axial MIP image of the 3D filtered image data using the max-min SD filtering (of either equation (2) or equation (3)) is shown in FIG. 5B. Image noise was substantially reduced compared to FIG. 5A. Vessel visibility and continuity were improved over that observed in FIG. 5A.

Figure 5C:
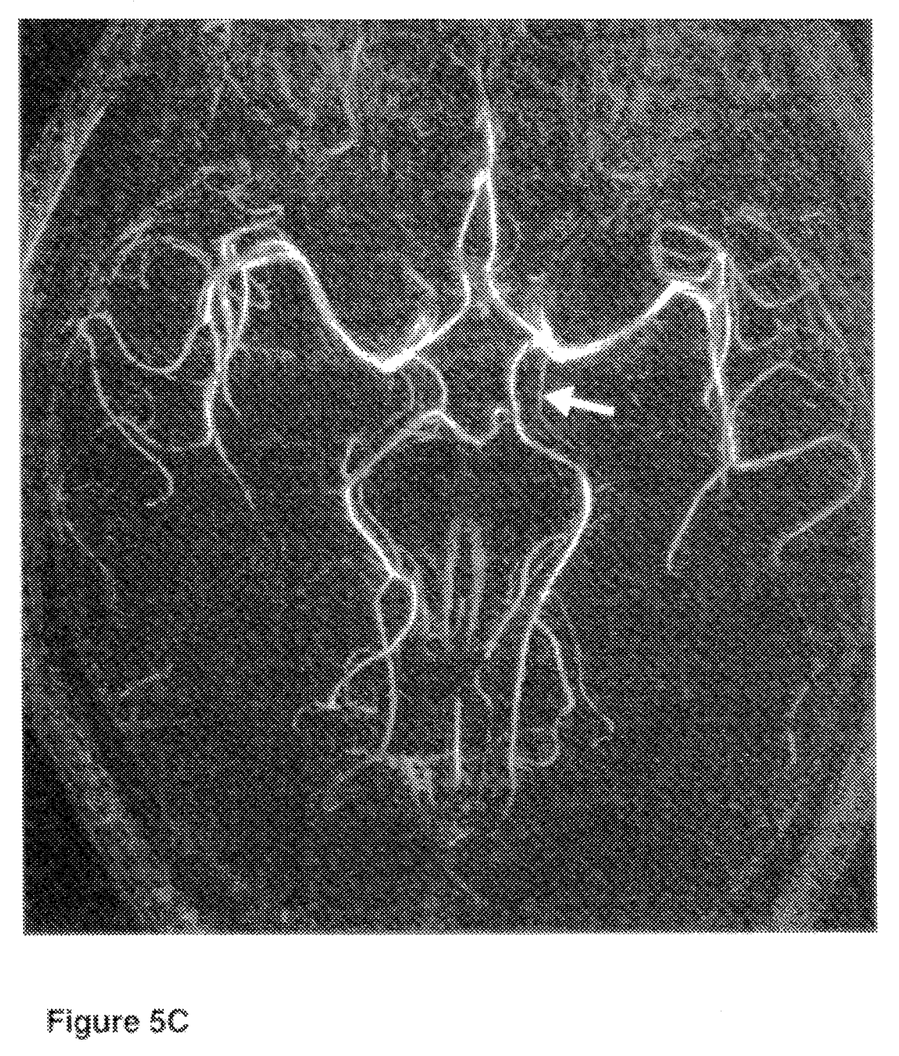
FIG. 5C is an MIP image of the image data of FIGS. 1A and 1B filtered with a "cross-section" filter.

FIG. 5C shows the MIP image of the cross-section filtering of the image in FIG. 1B. Again, a significant improvement in vessel visibility is observed by using this filter. Comparing to FIG. 5B, the vessels in the MIP image using cross-section filtering appear slightly thinner and sharper. However, the noise level is higher in FIG. 5C than that in FIG. 5B.

Figure 6:
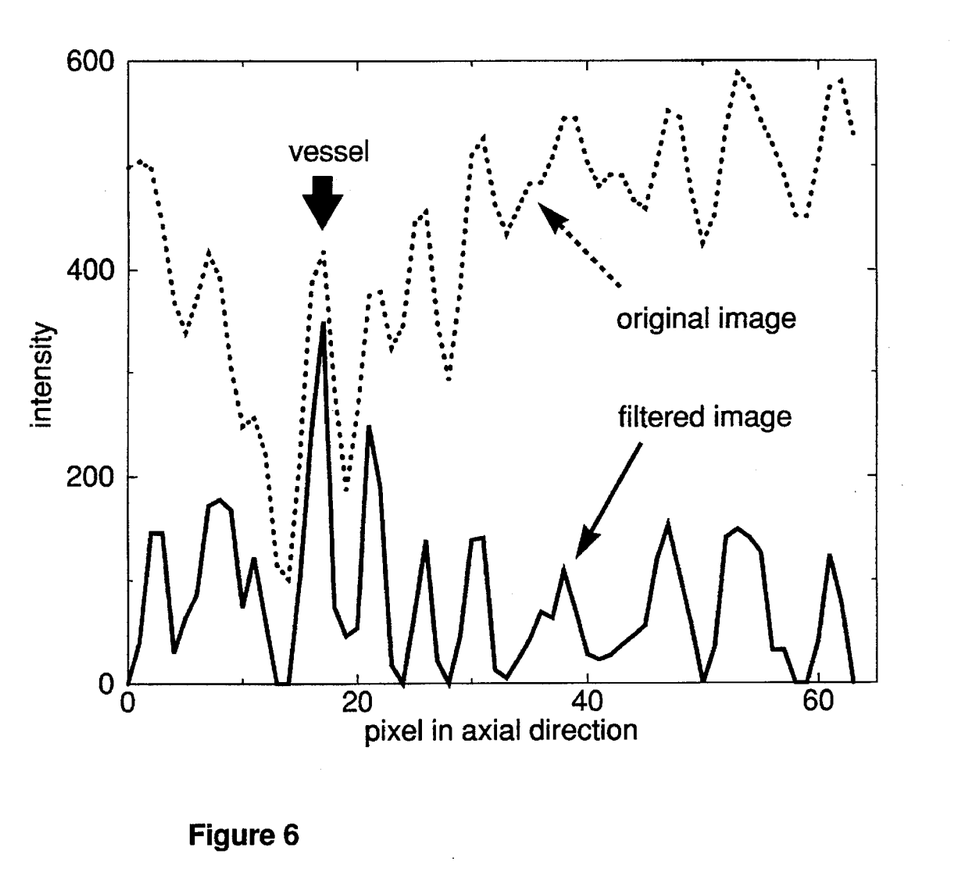
FIG. 6 shows a volume element ("voxel") intensity profile at a point (indicated by an arrow on FIG. 5B) along a projection ray (in the axial direction) for the original 3D image.

A close look at the 3D image data before and after the filtering should show us how small vessels are enhanced using the filters. FIG. 6 is the voxel intensity profile at a point (indicated by an arrow on FIG. 5B) along a projection ray (in the axial direction) for the original 3D image data and filtered 3D image data using the max-min SD filter. FIG. 6 clearly shows that the intensity of the right anterior choroidal artery (indicated by an arrow on FIG. 6) was significantly enhanced and the signal of the stationary background was greatly reduced.

G. Observations and Variations

Figure 7:
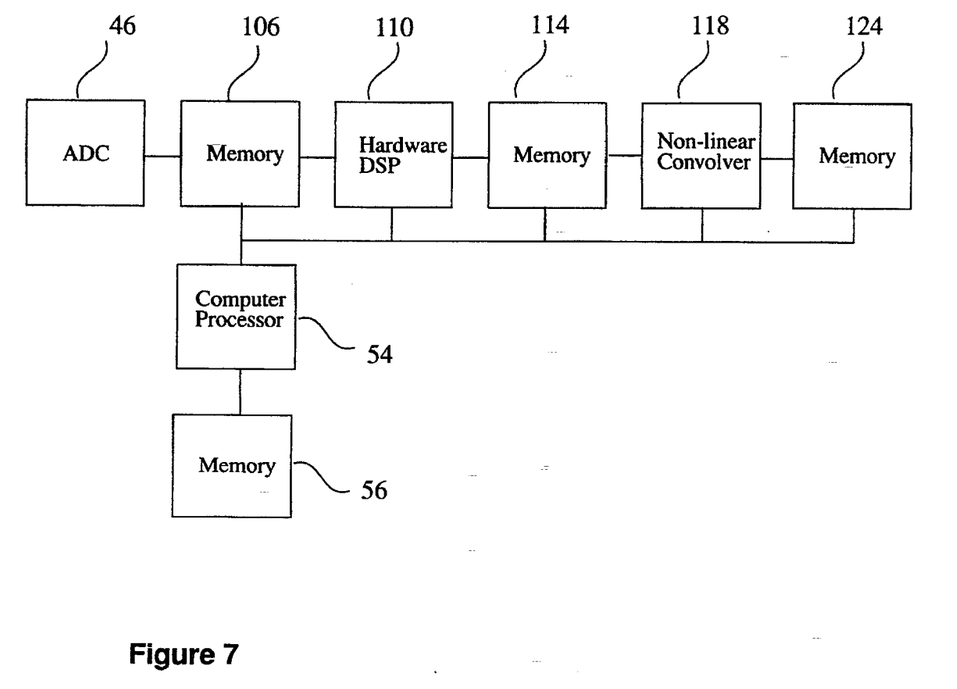
FIG. 7 is a schematic representation of a hardware implementation of the present invention.

FIG. 7 shows one arrangement for a hardware filter as an alternative to the software filter described above. Of course, other hardware circuits could perform the same function. Referring to FIG. 7, a hardware circuit 100 includes a memory 106 in which measurement data signal S is stored as a data matrix $M_4$ (which may be the same as data matrix $M_2$) surrounded by zeros that form a data matrix $M_5$ (which may be the same as data matrix $M_3$). In that sense, the Shift of data matrix $M_4$ into memory 106 may be said to be a zero-filled memory shift. Hardware digital signal processor (DSP) 110 performs a Fourier transform (such as an FFT) on data matrix $M_5$, the results of which produce a signal essentially the same as interpolated image data matrix $I_D$. Non-linear hardware convolver 118 is designed to perform the specific function of the max-min SD filter or the cross-section filter. The signal output from non-linear hardware convolver 118 is essentially the same as enhanced image data matrix $I_E$.

Matrices are often the most convenient way of assembling and thinking about data. Accordingly, the above-cited description refers to data matrices. However, the data in data matrices $M_2$, $M_3$, $M_4$, and $M_5$ could be expressed, assembled, or thought of in some other form without departing from the principles of the present invention.

Although the description above refers to vessels, the invention may be used to enhance other parts of the body, such as nerves and glands in magnetic resonance imaging.

Although the present invention has particular advantages in the area of MRA, it may also have utility for other imaging techniques. However, some imaging techniques may not involve all steps described herein. For example, some imaging techniques may not provide data in a frequency domain, in which case a transform may not be necessary.

The invention is not restricted to TOF MRA, but rather may also be applied to images obtained through other MRA techniques (e.g., phase contrast MRA).

A derivative filter may suppress stationary background and enhance detail structures, such as small vessels. For a small vessel which has higher signal intensity than surrounding background, a gradient filter might not be a good choice since it gives a positive value at one side of the vessel, but a negative value on the other side. To detect a small "bump-like" vessel structure, a second difference filter is a better choice.

A Laplacian operator is an isotropic SD filter. A small vessel is anisotropic in 3D image data while background and noise spikes are isotropic. A Laplacian filter enhances small vessels and suppresses background. However, it enhances noise and edge structures as well because of its isotropy. To enhance small vessels while suppressing noise, an anisotropic filter is preferred. The design of this anisotropic filter was based on modeling the appearance of vessels in MRA images and the properties of an SD filter.

The vessel enhancement filters were designed to enhance small vessels. Fortunately, big vessels are usually well visualized in filtered images. Nevertheless, "signal" loss of big vessels may be observed in some images.

The filtering process described above does not always give satisfactory performance in all areas of the images the inventors have studied to date. Performance might not be good in the region of orbits, possibly due to the rapid signal intensity change at the fat-muscle boundaries. Motion induced artifacts tend to be enhanced by these filters. The air-tissue and bone-tissue boundaries may be enhanced and appear as vessel-like line structures. However, the original image data are retained and, the original images can be used to help the clinical diagnosis whenever ambiguity exists.

Small vessels in 3D MRA images may not be visible in the MIP projections due to their low vessel contrast. Vessel enhancement filtering can significantly increase the visibility of small vessels in the MIP images of 3D MRA.

Various steps may be performed between the process steps described herein (e.g., for purposes beyond the scope of the present invention) without departing from the principles of the present invention. Likewise, various electrical circuitry components may be placed between the electrical circuitry components described herein (e.g., for purposes beyond the scope of the present invention) without departing from the principles of the present invention. Also, as used herein, "electrically connected" does not necessarily mean directly electrically connected. For example, connector 28 is electrically connected to multiplier 36 even though they are separated by preamplifier 32. The term "conductors" is used herein in the plural. However, data may be transmitted in parallel or in series.

Computer processor 54 may include an IBM compatible PC type computer, a MacIntosh type computer, a Sun Microsystems computer, or other similar computer. Simpler microprocessor microcomputers could be used. Computer processor 54 could be built specifically for the purposes of the present invention.

Memory 56 could be internal to or external to, or both internal and external to, computer processor 54.

As used herein, a Fourier transformation may be any operation that transforms the MR measurement data (in spatial frequency representation) to image data (in spatial representation) and is not limited to any particular transform.

It will be understood that certain features and subcombinations described herein are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense. Accordingly, the scope of the invention is indicated by the following claims, including equivalents thereof, rather than by the specific embodiments described in the preceding description.

What is claimed is:

1. A system for enhancing lines in images produced from data that represent a structure of anatomy of a subject and that are produced in a magnetic resonance imaging (MRI) device, the system comprising:

a detector that detects signals composed of energy passing through and modified by the structure of anatomy and that produces detection signals reflective of the detected modified energy signals;

preprocessing circuitry that receives the detection signals and provides preprocessed signals in response thereto; and processing circuitry that receives the preprocessed signals and performs a transformation thereon to provide an interpolated image data matrix $I_D$ and that performs a max-min second difference (SD) line enhancing filtering process on the interpolated image data matrix $I_D$ to provide an enhanced image data matrix $I_E$ in which lines are enhanced.

2. The system of claim 1 in which the filtering process is of the form $SD_{ij}=2f(i)-f(i-1)-f(i+1)$, where $f(i)$ is the image intensity at point i, and $f(i-1)$ and $f(i+1)$ are the image intensity at the neighboring points of $f(i)$ along direction j.

3. The system of claim 1 in which the filtering process is applied in thirteen directions around every image point.

4. The system of claim 1 in which the filtering process determines the difference between the maximum SD and the maximum of zero and the minimum SD.

5. The system of claim 1 in which the filtering process is performed in a hardware filter.

6. The system of claim 1 in which the transformation is a zero-padded Fourier transformation.

7. The system of claim 6 in which intermediate processes are performed on the preprocessed data signals prior to the zero-padded Fourier transformation.

8. A system for enhancing lines in images produced from data that represent a structure of anatomy of a subject, the system comprising:

a detector that detects signals composed of energy passing through and modified by the structure of anatomy and that produces detection signals reflective of the detected modified energy signals;

preprocessing circuitry that receives the detection signals and provides a preprocessed signals in response thereto; and processing circuitry that receives the preprocessed signals and performs a zero-padded transformation thereon to provide interpolated image data and that performs a line enhancing filtering process on the interpolated image data to provide enhanced image data in which lines are enhanced.

9. The system of claim 8 in which the line enhancing filtering process is a second difference (SD) filtering process.

10. The system of claim 9 in which the second difference (SD) filtering process is a non-linear filtering process.

11. The system of claim 9 in which the second difference (SD) filtering process is a max-min SD filtering process.

12. The system of claim 9 in which the second difference (SD) filtering process is a cross-section filtering process.

13. The system of claim 10 in which the non-linear filtering process includes a second difference (SD) operation of the form $SD_{ij}=2f(i)-f(i-1)-f(i+1)$, where f(i) is the image intensity at point i, and f(i−1) and f(i+1) are the image intensity at the neighboring points of f(i) along direction j.

14. The system of claim 11 in which the max-min SD filtering process determines the difference between the maximum SD and the maximum of zero and the minimum SD.

15. The system of claim 8 in which the line enhancing filtering process is performed in a hardware filter.

16. A processing system for enhancing lines in images produced from data that represent a structure of anatomy of a subject and that is detected from signals composed of energy passing through and modified by the structure of anatomy and that is preprocessed to produce preprocessed signals, the computer processing system comprising:

a receiving port for receiving the preprocessed signals;

memory in which the preprocessed signals are zero-padded; and processing circuitry that performs a transformation on the preprocessed signals to produce transformed image data and that performs a multi-directional second difference (SD) line enhancing filtering process on the transformed image data to provide enhanced image data in which lines are enhanced.

17. The system of claim 16 in which processing circuitry includes a hardware filter to perform the line enhancing filtering process.

18. The system of claim 16 in which the transformation is a Fourier transformation.

19. A system for enhancing lines in images produced from data that represent a structure of anatomy of a subject and that are produced in a magnetic resonance imaging (MRI) device, the system comprising:

a detector that detects signals composed of energy passing through and modified by the structure of anatomy and that produces detection signals reflective of the detected modified energy signals;

preprocessing circuitry that receives the detection signals and provides preprocessed signals in response thereto; and processing circuitry that receives the preprocessed signals and performs a transformation thereon to provide an interpolated image data matrix $I_D$ and that performs a multi-directional second difference (SD) line enhancing filtering process on the interpolated image data matrix $I_D$ to provide an enhanced image data matrix $I_E$ in which lines are enhanced.

20. The system of claim 19 in which the filtering process is a max-min SD filtering process.

21. The system of claim 19 in which the filtering process is a cross-section filtering process.

22. The system of claim 19 in which the transformation is a zero-padded Fourier transformation.

23. The system of claim 19 in which the filtering process is of the form $SD_{ij}=2f(i)-f(i-1)-f(i+1)$, where f(i) is the image intensity at point i, and f(i−1) and f(i+1) are the image intensity at the neighboring points of f(i) along direction j.

24. A system for enhancing lines in images produced from data that represent a structure of anatomy of a subject and that are produced in a magnetic resonance imaging (MRI) device, the system comprising:

a detector that detects signals composed of energy passing through and modified by the structure of anatomy and that produces detection signals reflective of the detected modified energy signals;

preprocessing circuitry that receives the detection signals and provides preprocessed signals in response thereto; and a computer processor system that receives the preprocessed signals and performs a transformation thereon to provide an interpolated image data matrix $I_D$ and that performs a cross-sectional line enhancing filtering process on the interpolated image data matrix $I_D$ to provide an enhanced image data matrix $I_E$ in which lines are enhanced.

* * * * *

UNITED STATES PATENT AND TRADEMARK OFFICE
CERTIFICATE OF CORRECTION

PATENT NO. : 5,644,646

DATED : July 1, 1997

INVENTOR(S) : Du et al.

It is certified that error appears in the above-identified patent and that said Letters Patent is hereby corrected as shown below:

In Column 2, line 59, before "discrete" insert --13--;

In Column 8, line 3, change "SIGNAMR" to --SIGNA MR--;

In Column 11, line 9, after "provides" delete --a--;

In Column 11, line 38, change "represent" to --represents--.

Signed and Sealed this

Eleventh Day of August 1998

*Attest:*

BRUCE LEHMAN

*Attesting Officer*   *Commissioner of Patents and Trademarks*